P. L. SORENSEN.
PITCH PIPE.
APPLICATION FILED MAY 29, 1917.
1,246,483.
Patented Nov. 13, 1917.
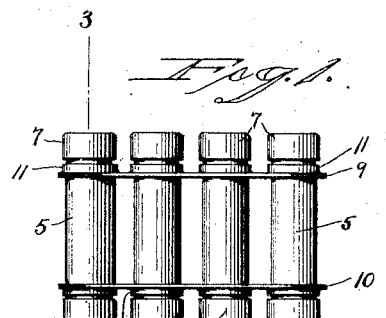
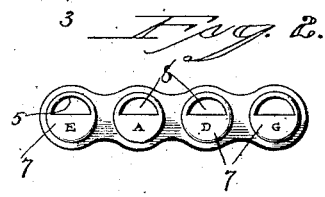
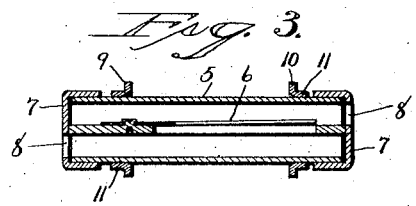
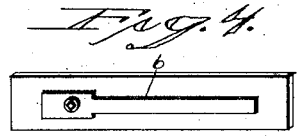
Inventor
Peter L. Sorensen
by Seymour Earle
Atty

UNITED STATES PATENT OFFICE.

PETER L. SORENSEN, OF MERIDEN, CONNECTICUT, ASSIGNOR TO THE PEERLESS MFG. CO., OF MERIDEN, CONNECTICUT, A CORPORATION.

PITCH-PIPE.

1,246,483.   Specification of Letters Patent.   Patented Nov. 13, 1917.

Application filed May 29, 1917.   Serial No. 171,647.

*To all whom it may concern:*

Be it known that I, PETER L. SORENSEN, a citizen of the United States, residing at Meriden, in the county of New Haven and State of Connecticut, have invented a new and useful Improvement in Pitch-Pipes; and I do hereby declare the following, when taken in connection with the accompanying drawings and the characters of reference marked thereon, to be a full, clear, and exact description of the same, and which said drawings constitute part of this application, and represent, in—

Figure 1 a side view of a pitch pipe constructed in accordance with my invention.

Fig. 2 an end view of the same.

Fig. 3 a sectional view on the line 3—3 of Fig. 1.

Fig. 4 a perspective view of a reed, detached.

This invention relates to an improvement in pitch pipes, the object being to simplify the construction and give a finished appearance to the pipe, and the invention consists in the construction hereinafter described and particularly recited in the claims.

In carrying out my invention I employ a tube 5 of suitable diameter in which I locate a reed 6 of usual construction, the length of the reed corresponding substantially to the length of the tube 5. Over the ends of the tube I then place caps 7 the caps being formed with openings 8, and the caps turned so that the opening through one cap is above the reed, while the opening in the other cap is below the reed, the edges of the opening being in line with the opposite faces of the reed. These caps give a neat finish to a pitch pipe and present a mouthpiece having rounded edges. These pitch pipes are frequently arranged in series as shown in Figs. 1 and 2 of the drawings, and to connect these pipes in series I employ strips 9 and 10 which are struck up to form openings for the pipes, the metal around the openings forming collars 11 which are of a size to closely fit the tubes so that when the tubes are driven through the openings they will be held without the use of solder which tends to discolor the finish on the tubes. I am thus enabled to connect a series of pipes without the use of solder, and as before stated, the pipes are provided with mouthpieces having rounded edges.

I claim:—

1. A pitch pipe comprising a tube, a reed therein and caps applied to opposite ends of the tubes said caps formed with openings respectively located above and below the face of the reed.

2. A pitch pipe comprising a series of tubes each containing a reed, caps applied to the opposite ends of each tube; combined with two interlocking strips formed with holes through which the tubes extend, the said holes surrounded by integral collars closely fitting the said tubes.

In testimony whereof, I have signed this specification in the presence of two subscribing witnesses.

PETER L. SORENSEN.

Witnesses:
JAS. F. GRADY, Jr.,
DENIS T. O'BRIEN, Jr.

Copies of this patent may be obtained for five cents each, by addressing the "Commissioner of Patents, Washington, D. C."